Patented Nov. 19, 1929

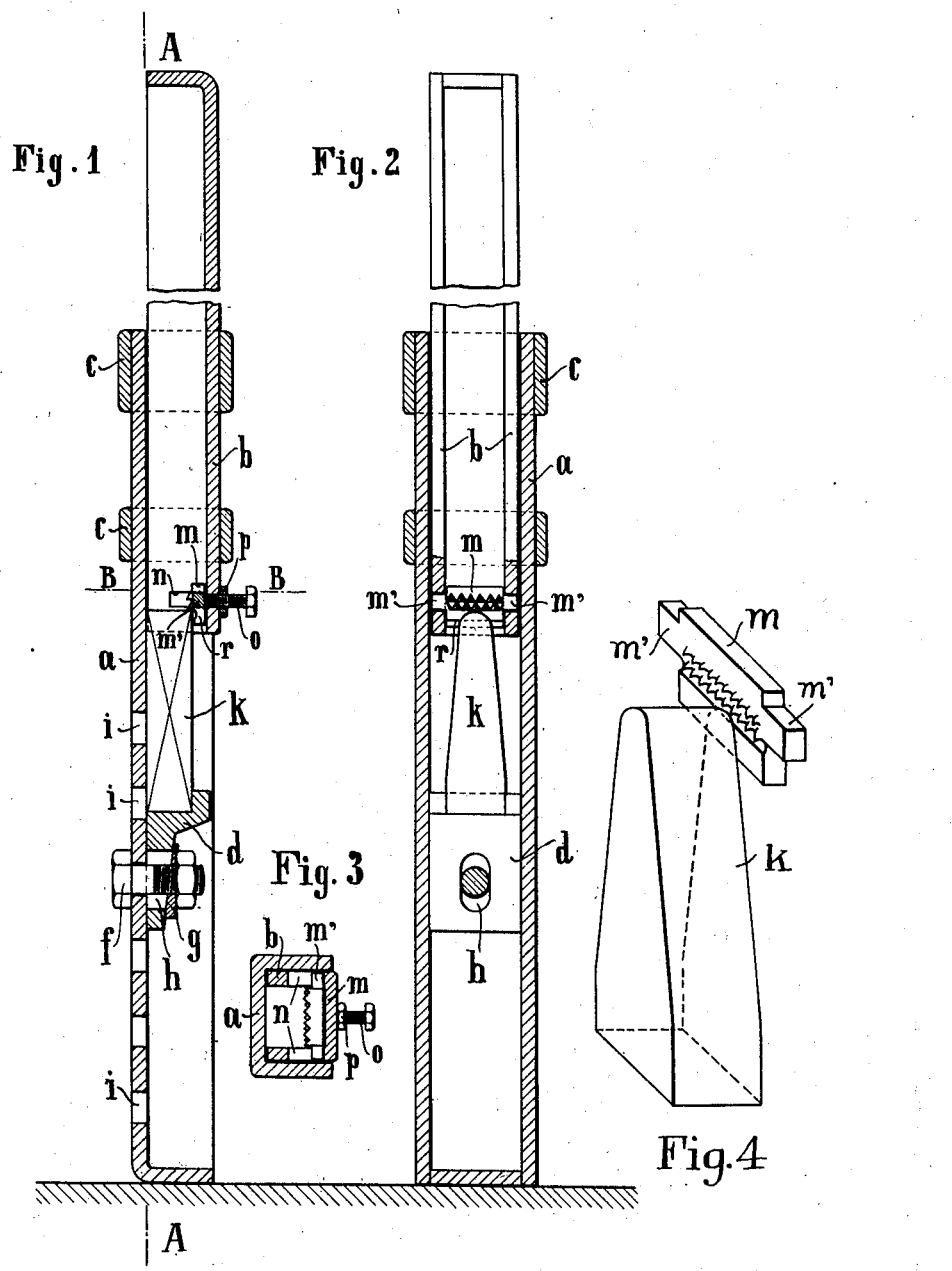

1,736,301

UNITED STATES PATENT OFFICE

JULIUS WÜSTENHÖFER, OF DORTMUND, GERMANY

MINER'S STAY

Application filed June 24, 1926, Serial No. 118,211, and in Germany August 6, 1924.

The invention relates to an adjustable stay or stemple for the timbering of mines consisting of two members which may be shifted one against the other like a telescope, one of these members supporting a cutting tool which takes off chips from a supporting block supported by the other stay-member, when pressing together the stay-members, thereby absorbing the ground pressure.

According to the invention both the supporting block and the cutting tool are shaped and arranged in such a manner that the cutting pressure and, therefore, the cutting resistance increases with the down stroke of the stay. By this arrangement the stay is automatically adjusted to the increasing ground pressure, and the amount of the latter may be determined at any time from the relative position of the two members.

In order to obtain this increasing cutting pressure the supporting block is so shaped that its width increases towards the end of the stroke; the supporting block embodies, for instance, the shape of a cone upon the surface of which the cutting tool acts; the supporting block may also have the shape of a wedge, the surface of the wedge upon which the cutting tool acts increasing towards the wedge base. The wedge shape has the advantage that the cutting tool essentially acts upon a plain surface so that the tool may be fed towards the working surface, after the stay has finished the stroke. Thus, the stay may be used several times successively without changing the supporting block, one layer of cutting being taken off with every stroke, until the supporting block has been completely used up.

The essential features of the invention will be apparent from the accompanying drawing which shows by way of example a preferred embodiment of the new stay. In the drawing:

Fig. 1 is a longitudinal section seen from the side of the stay,

Fig. 2 is a longitudinal section on the line A—A of Fig. 1, looking from the left side in Fig. 1, and Fig. 3 is a cross-section on the line B—B of Fig. 1.

Fig. 4 is a perspective view of the supporting block and the cutting tool.

In the illustrated example, the stay essentially consists of a U-iron $a$, provided with a greater web height, and a U-iron $b$, provided with a smaller web height, both irons being held together by a collar $c$, so that they may be shifted longitudinally one against the other. The lower stay member $a$ is provided with a support $d$, this being adjustable within a long hole $h$ by means of a screw bolt $f$ and a key $g$. For making rough support adjustments, a number of holes $i$ is provided in the web of the U-iron $a$, which may be used selectively for adjusting the screw bolt $f$.

The support $d$ serves for holding a supporting block $k$, from which stock is to be removed, when the stay-members are shifted one against the other. As shown, the support $d$ is recessed to receive the lower portion of the block $k$, the recess being so shaped as to form a flange $d'$ engaging the relatively outer face of the block and pressing it against the inner face of the body of the stay $a$, whereby said block is supported and held in position. The upper member $b$ receives a cutting tool $m$, the latter being guided with lateral extensions $m'$ in corresponding slots $n$ of the U-iron flanges, so that the tool may be fed towards the supporting block $k$ by means of a screw $o$ and a lock nut $p$. The cutting tool $m$ possesses two series of cutting teeth arranged one after another, the rear series being laterally set-over against the front one in such a manner that the teeth of one series are opposite to the tooth spaces of the other series. By arranging the cutter teeth in this manner, the grooves cut by the first tooth series into the supporting block $k$ will be removed by the second tooth series, the surface of the supporting block, thus, being smoothed. When the stay is to be used again, after having reached its lower stroke end, it is only necessary to raise the upper stay member, and to advance the cutting tool $m$ by the screw $o$, this adjustment being stopped by the dog $r$ projecting from the lower end of the cutting tool, the latter, thus, can only be advanced as far as the desired thickness of cutting is obtained.

From Fig. 2 it will be apparent that the supporting block $k$ has the shape of a wedge, the width of the working surface increasing towards the lower wedge end. The cutting section of the stock to be removed and, therefore, the cutting resistance increases towards the end of the stroke. According to the vertical position of the stay members the working pressure, and from the latter the corresponding ground pressure can be determined.

Of course, the invention is not limited to the embodiment shown, on the contrary other arrangements of the new stay are possible without departing from the spirit of the invention as pointed out in the claims. For example, instead of using a wedge-shaped supporting block, the latter may also have the shape of a cone the cutter teeth acting on the convex-surface of the cone. Moreover, the stay members may consist of tubular sections instead of U-shaped ones.

I claim:

1. A miner's stay, comprising telescopic lower and upper stay-members, a supporting block carried by one of the said stay-members, and a cutting tool carried by the other stay-member for cutting chips from the said supporting block upon a downward movement under pressure of the upper stay member, the said supporting block tapering toward its upper end so that its thickness increases toward its lower end in the direction of motion of the cutting tool to institute a progressively increased resistance to the cutting action of the cutting tool, on such downward motion of the upper stay member.

2. A miner's stay according to claim 1, characterized by the supporting block being mounted on a support, with means for securing the support at different elevations to the stay, and auxiliary means for adjusting the support vertically for fineness of adjustment in each position in which it is secured.

3. A miner's stay according to claim 1, characterized by the stay-member carrying the cutting tool being provided with side flanges having slots, and the cutting tool having lateral guiding extensions engaging said slots.

4. A miner's stay according to claim 1, characterized by the cutting tool being mounted on the stay for adjustment toward and from the supporting block and provided with a stop adapted to bear against the supporting block to regulate its cutting depth.

5. A miner's stay according to claim 1, characterized by the cutting tool being provided with two series of cutting teeth arranged one after the other in the direction of the cutting stroke and staggered with relation to one another.

6. A miner's stay according to claim 1, characterized by the lower stay-member consisting of a channel iron provided with a greater height of the flanges, the upper stay-member consisting of a channel iron provided with a smaller height of the flanges, said upper member being guided within the lower member, a supporting block mounted for vertical adjustment on the body part of the lower stay-member, and a cutting tool mounted for adjustment relatively to the supporting block on the flanges of the upper stay-member.

In testimony whereof I affix my signature.

JULIUS WÜSTENHÖFER.